United States Patent [19]
Fernandez

[11] 4,109,684
[45] Aug. 29, 1978

[54] METHOD AND APPARATUS FOR REPAIRING LEAKS IN WATER HEATERS

[76] Inventor: Robert R. Fernandez, 221 W. 57th St., B-85, Loveland, Colo. 80537

[21] Appl. No.: 787,508

[22] Filed: Apr. 14, 1977

[51] Int. Cl.² .................................... F16L 55/18
[52] U.S. Cl. ........................ 138/97; 29/458; 29/451; 29/401 E
[58] Field of Search ............ 29/401 C, 401 D, 401 E, 29/401 R, 458, 450, 451, 469.5, 235; 138/97, 98; 285/15; 166/277

[56] References Cited

U.S. PATENT DOCUMENTS

| | | | |
|---|---|---|---|
| 2,977,994 | 4/1961 | Xenis | 138/97 |
| 3,144,880 | 8/1964 | Witska | 138/97 |
| 3,267,967 | 8/1966 | Guthrie | 138/97 |
| 3,474,832 | 10/1969 | Broadhead et al. | 138/97 |
| 3,830,260 | 8/1974 | Baviello, Sr. | 138/97 |

*Primary Examiner*—Milton S. Mehr
*Attorney, Agent, or Firm*—William E. Hein

[57] ABSTRACT

A typical pinhole leak that has occurred along the flue pipe of a water heater is quickly and effectively repaired by employing a spring-tempered, sealant-coated cylindrical repair section that is first coaxially positioned inside the flue pipe in a compressed position and that is subsequently triggerably released to spring to an expanded position whereby a permanent sealant layer is formed between the cylindrical repair section and the flue pipe.

3 Claims, 4 Drawing Figures

METHOD AND APPARATUS FOR REPAIRING LEAKS IN WATER HEATERS

BACKGROUND AND SUMMARY OF THE INVENTION

This invention relates generally to the repair of leaks in pipe and more specifically to the repair of leaks that occur in the flue pipe of water heaters. Gas fired water heaters of the type commonly employed in both residential and commercial applications are generally arranged for heating a water reservoir contained between two coaxial cylinders of different diameter. The smaller of the two cylinders is typically employed as a flue pipe for discharging fumes released by the water heater's gas burner. Such water heaters exhibit problems due to the fact that water vapor collects on the inner surface of the flue pipe near the top of the water heater, thus promoting rusting and corrosion of the flue pipe and the consequent premature failure of the water heater due, usually, to the development of a single pinhole leak along the flue pipe. Water heaters that develop such a pinhole leak are regularly discarded because of the absence of convenient and effective repair techniques, despite the fact that such water heaters are otherwise completely operative.

In accordance with the illustrated preferred embodiment of this invention a water heater that has developed a typical pinhole leak along the flue pipe is quickly, easily, and effectively repaired by employing an inexpensive spring-tempered, sealant-coated cylindrical repair section that is first coaxially positioned inside the flue pipe adjacent the leak in a compressed or closed position and that is then triggerally released to spring to an expanded or open position whereby a permanent sealant layer is formed between the cylindrical repair section and the inner wall of the flue pipe at the point of the leak to effect repair thereof. The apparatus and method of the present invention will be found to have particularly significant utility in repairing pipe faults in environments similar to that of the flue pipe of a water heater wherein the pipe to be repaired is enclosed such that access for purposes of conventional repair by means of weld and solder techniques is not possible.

DESCRIPTION OF THE PREFERRED EMBODIMENT

Figure 1:
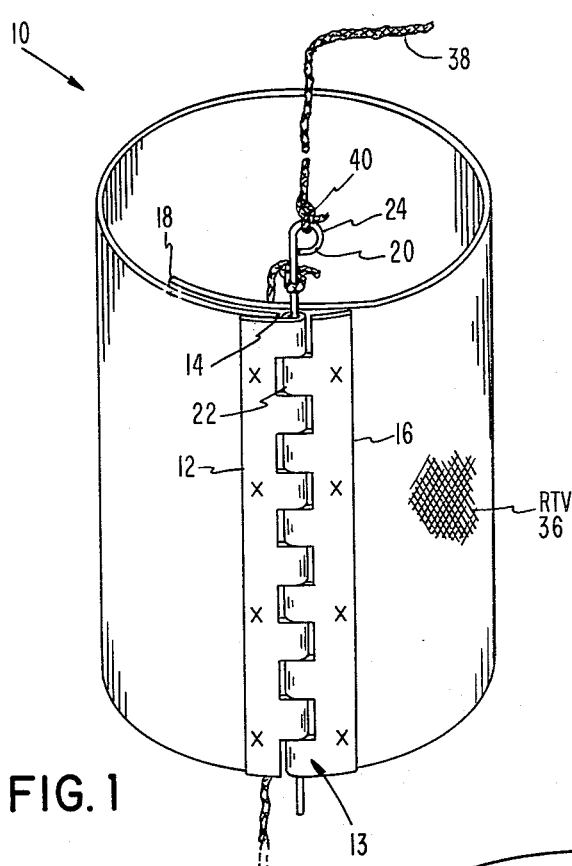
FIG. 1 is an isometric view of a cylindrical repair section that is employed for repairing leaks in pipe in accordance with the present invention.

Referring now to FIG. 1, there is shown a cylindrical repair section 10 that is constructed and employed in accordance with the present invention to repair a pipe leak such as a pinhole leak that develops along the flue pipe of a typical residential water heater. Cylindrical repair section 10 is preferably constructed by rolling a rectangular sheet of stainless steel into a generally cylindrical configuration having parallel edges 14 and 18. Although another material may be selected for use in fabricating cylindrical repair section 10, a sheet of AISI No. 301 stainless steel has been found to have a sufficiently high yield strength to impart the required spring temper characteristic to the cylindrical repair section. A lacing member 13 is generally constructed in a manner similar to that of a piano hinge. Lacing member 13 comprises two mating sections 12 and 16, each of which includes a plurality of lacing eyelets 22.

Figure 2:
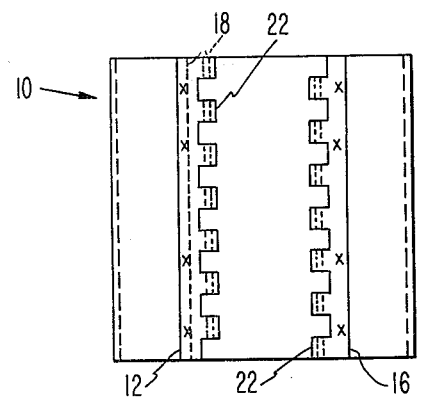
FIG. 2 is a front elevation view of the cylindrical repair section of FIG. 1 illustrating an open or unlaced position thereof.
Figure 3:
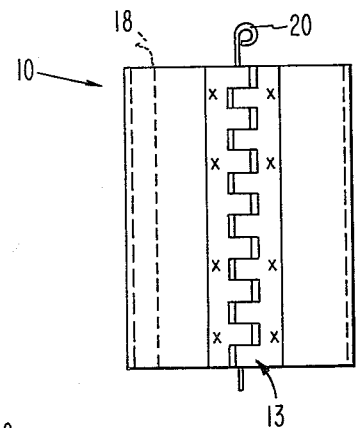
FIG. 3 is a front elevation view of the cylindrical repair section of FIG. 1 illustrating a closed or laced position.
Figure 4:
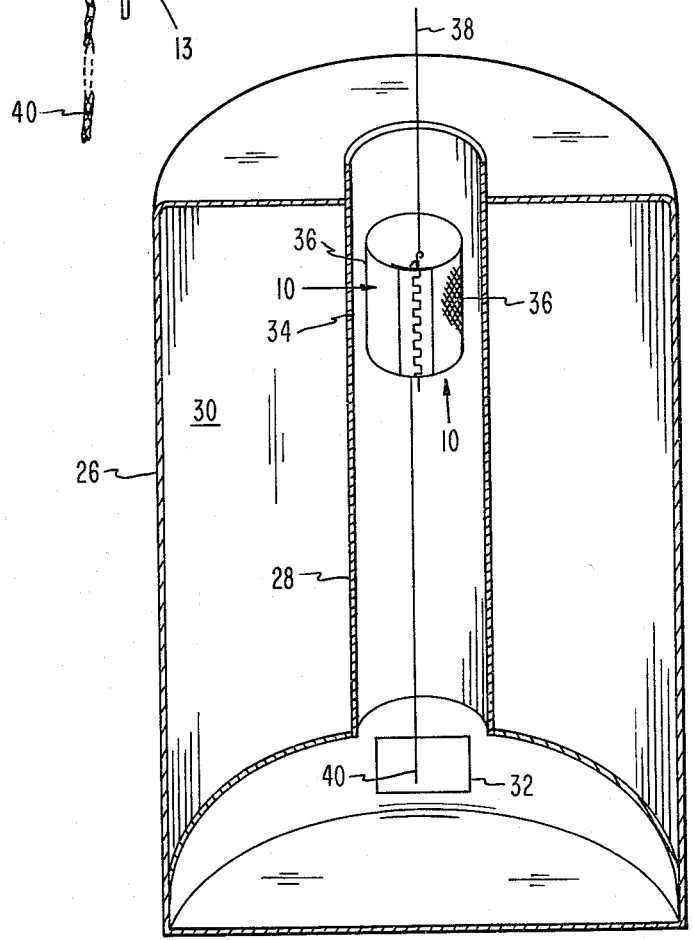
FIG. 4 is an isometric view of a typical water heater broken away illustrating the placement of the cylindrical repair section of FIG. 1 to accomplish repair of a pinhole leak in the flue pipe of the water heater.

A steel lacing pin 20 is inserted through the plurality of lacing eyelets 22 to secure the two mating sections 12 and 16 of lacing member 13 and to thus hold cylindrical repair section 10 in the compressed or closed position. Section 12 of lacing member 13 is attached, for example, by spot welding it to the outer surface of the cylindrical repair section 10 along edge 14 thereof. Section 16 of lacing member 13 is similarly attached to the outer surface of cylindrical repair section 10 spaced a predetermined distance back from edge 18 thereof so that a slight overlap condition exists between parallel edges 14 and 18 when the cylindrical repair section is in the expanded or open position. This overlap condition enables the cylindrical repair cylinder 10 to be more easily manually compressed for purposes of inserting lacing pin 20. FIGS. 2 and 3 are front elevations of the cylindrical repair section 10 of FIG. 1, illustrating the relative positions of mating sections 12 and 16 of lacing member 13 when cylindrical repair section 10 is in the open or unlaced position and in the closed or laced position, respectfully. As shown in FIG. 2, in the absence of lacing pin 20, cylindrical repair section 10 expands to an open position due to an unrolling tendency or spring temper characteristic that is a function of the yield strength of the material from which cylindrical rapair section 10 is fabricated.

Referring now to FIG. 3, there is shown a typical water heater that includes an outer cylinder or shell 26, an inner cylinder 28, and a water reservoir 30 formed therebetween. Inner cylinder 28 is typically employed as a flue pipe for the discharge of fumes generated from a gas burner located below water reservoir 30. A port 32 is typically provided to permit access to a pilot burner also located below water reservoir 30.

For purposes of illustrating the operation of cylindrical repair section 10, it is assumed that a typical pinhole leak has developed at a point 34 along the wall of flue pipe 28. The inner surface of flue pipe 28 is preferably first cleaned in the vicinity of leak 34 by means of any of a number of commonly known flue and pipe cleaning techniques. The outer surface of cylindrical repair section 10 is then coated with a sealant 36 that may comprise, for example, Silastic 732 RTV adhesive/sealant manufactured by Dow Corning Corporation. Sealant 36 is preferably applied somewhat uniformly to the outer surface of cylindrical repair section 10 to provide a coating of approximately ⅛ inch in thickness. Pipe repair cylinder 10 is then lowered into flue pipe 28 by way of a flexible cord 38 that is attached to an eyelet portion 24 of lacing pin 20. Another flexible cord 40 is attached for slippage aong a shank portion 42 of lacing pin 20 and is permitted to drop down flue pipe 28 to be accessed through port 32. Cylindrical repair section 10 is thus temporarily supported inside flue 28 adjacent pinhole leak 34 by way of flexible cord 38. Preferably, cylindrical repair section 10 is positioned such that lacing member 13 is approximately 180° away from pinhole leak 34.

Flexible cord 40 is then held firmly by the user or is anchored by typing it to a structural member of the water heater accessible through port 32. An upward force is finally applied to flexible cord 38, thus removing lacing pin 20 from eyelets 22 of lacing member 13 and permitting cylindrical repair section 10 to spring into the expanded or open position, as illustrated in FIG. 2. The diameter of cylindrical repair section 10 is chosen such that when in the laced or closed position it can be conveniently lowered into flue pipe 28. At the same time, however, it is desirable to choose the diameter of the cylindrical repair section such that when in the expanded or open position a sufficient radial force is applied to the flue wall due to the unrolling tendency of the cylindrical repair section to firmly hold it in place against the wall of the flue to effect a reliable seal in the area of the leak. A cylindrical repair section having a length of approximately 5 inches, fabricated of 20 gauge AISI No. 301 stainless steel, and having a closed or laced diameter of approximately 3¼ inches has been found to work satisfactorily with a common variety of water heater that has a flue pipe approximately 3¾ inches in diameter.

While the present invention has been described in connection with a specific embodiment thereof, it will become apparent to those persons skilled in the art that various modifications and applications are possible. It is desired, therfore, that the invention not be limited to the details of construction illustrated and described hereinabove, and it is intended by the appended claims to cover all modifications which fall within the spirit and scope of the invention.

I claim:

1. Apparatus for repairing a leak in a length of pipe, the apparatus comprising:
   a sealant-coated, generally cylindrical metallic repair section having a spring temper characteristic and being formed to include a first longitudinal edge and a second longitudinal edge that overlaps the first longitudinal edge;
   a pair of mating lacing members attached to the outer surface of said repair section, one of said pair of mating lacing members being attached along said second longitudinal edge and the other one of said pair of mating lacing members being attached a predetermined distance away from said first longitudinal edge such that said repair section is in a compressed cylindrical position when said mating lacing members are in a laced position;
   a lacing pin securing the mating lacing members in said laced position, thereby maintaining the repair section in the compressed cylindrical position; and
   means for removing said lacing pin after the repair section has been coaxially positioned inside the length of pipe adjacent the leak, whereupon the repair section is permitted to spring to an expanded cylindrical position, thereby exerting a force against the inside surface of the pipe to form a permanent sealant layer in the area of the leak to effect repair thereof.

2. Apparatus for repairing a leak in a length of pipe as in claim 1 wherein the pair of mating lacing members includes a plurality of alternately positioned lacing eyelets for receiving said lacing pin.

3. Apparatus for repairing a leak in a length of pipe as in claim 2 wherein the generally cylindrical repair section comprises a rolled rectangular sheet of stainless steel.

* * * * *